Figure 1:
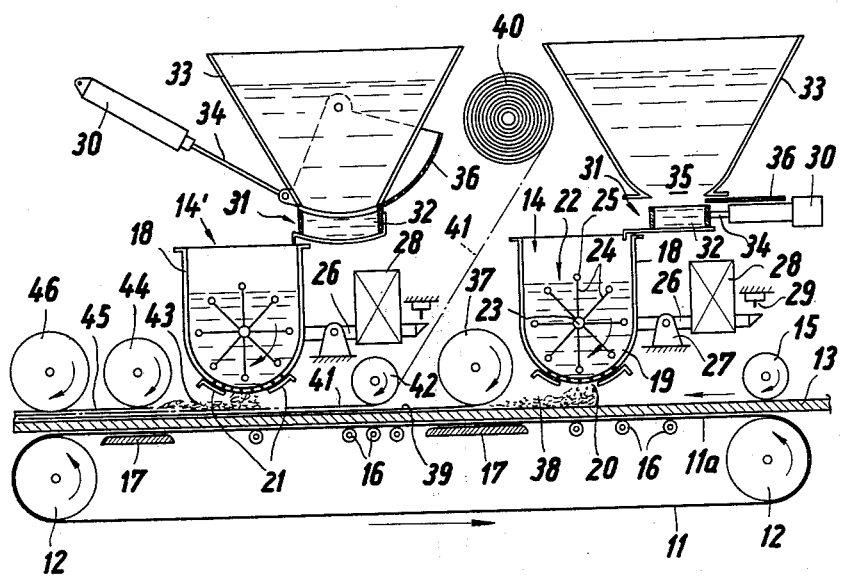

Jan. 4, 1966   K. KURZ   3,227,590
PROCESS AND APPARATUS FOR APPLYING COATINGS TO INSULATING
PANELS AND LAMINATED INSULATING PANELS
Filed May 15, 1963   2 Sheets-Sheet 1

Inventor:
Karl Kurz
By
Mestern + Mestern

United States Patent Office 3,227,590
Patented Jan. 4, 1966

3,227,590
PROCESS AND APPARATUS FOR APPLYING COATINGS TO INSULATING PANELS AND LAMINATED INSULATING PANELS
Karl Kurz, Bad Waldsee, Wurttemberg, Germany, assignor to Südbau Süddeutsche Bautechnik G.m.b.H., Bad Waldsee, Wurttemberg, Germany
Filed May 15, 1963, Ser. No. 280,549
Claims priority, application Germany, May 18, 1962, S 84,578
7 Claims. (Cl. 156—73)

The invention relates to a process and apparatus for the application of coatings or covering layers of natural, more particularly mineral, and/or synthetic, preferably water-based substances comprising more particularly foamed, sawdust-filled hard plastics, such as inflatable polystyrene, to a core plate made of hard foamed plastics or the like, for the preparation of insulating panels having hard but resilient and load-bearing (and possibly reinforced) layers on one or both sides, the panels being made of a hard foamed plastics plate having a possibly plasticized water-based covering layer on at least one side, and to laminated insulating panels produced by the process.

Laminated insulating panels are known per se in a very wide variety of constructions, the only differences between them really lying in the composition of the material used for the covering layers.

It has been found that core plates made of insulating substances can readily be given covering layers manually with considerable labor, but the industrial production of such laminated panels is particularly difficult, more particularly in cases where the covering layers are in the form of water-based mineral substances to which a fibrous synthetic or natural material, such as sawdust or chips of foamed hard plastics and/or glass fibers of a particular length, have been added. Endeavors to coat panels by conventional methods have shown that the end products were completely useless since they did not satisfy even a single requirement. In particular, the coatings were so uneven that none of the known means for evening out and uniformly distributing the covering composition on the backing could help to provide a covering layer or coating of uniform thickness. The main reason for this is that the core plates of hard foamed plastics or some similar material have some natural resiliency; consequently, they yield at places where there is an excess of coating material when the distributing tools come into action, and so the excess material is not removed from this place. Also, the material used for the covering layer is relatively soft and doughy and, because of its composition, is resilient, and so is very difficult to distribute evenly and uniformly.

After extensive research, I now have evolved a method enabling covering layers to be applied in any desired thickness and completely uniformly to insulating core plates in continuous industrial operation. According to the invention, the doughy material which forms the covering layer is applied to the horizonntal core plate substantially in the form of small particles by dropping or flingcasting until a layer of the required thickness has been formed, whereafter such layer is evened out, compressed and smoothed by means of one or more oscillating reciprocating rollers.

Preferably, the material forming the covering layer is applied to the core plate, which moves at a continuous speed relatively to a charging station, along a stationary line extending over the whole width of the core plate. Of course, the coating device can move relatively to fixedly horizontal core plates, but it is better economically for the plates to move through below the coating device.

One or more covering layers or coatings can be applied to the core plates by the procedure according to the invention. Very advantageously, the coatings are reinforced with a web of glass fiber fabric. The reinforcement is embedded between two covering layers, and the fabric web is placed on the first layer, then covered with the second covering layer. For very satisfactory embedding of the glass fiber fabric, preferably the first covering layer is compressed considerably by a roller immediately before the fabric web is placed on it; consequently, liquid collects on the surface of the covering layer and considerably improves the embedding of the fabric web. The latter then is pressed by a roller into the high-liquids-contents surface of the covering layer, whereafter the second covering layer is applied in the same manner as the first coating.

Particularly good embedding of the glass fiber fabric is attained if the same has a mesh size at least slightly greater than the grain size of the material used for the covering layer. An important factor in distributing, evening out and smoothing the covering layers is that the tools used for the jobs must perform oscillating motions parallel with the surface at an amplitude of from about 20 to 50 mm. The frequency of the reciprocation should not be too high; if it is, the material is unaffected and the required effect is not attained. Very advantageously, the frequency of the oscillations or vibrations is from about 280 to 360 oscillations/min.; it has been found that the material does not stick to the rollers under these conditions. If the coating is to have a satisfactory surface, it is important that the roller reciprocation be of a sawtooth and not of a sinusoidal or similar nature.

To further improve matters, more particularly to ensue very good compression, the tools, more particularly the rollers, are given an extra oscillation or vibratory movement parallel to the core plate and to the covering layers and perpendicularly to the axial oscillations; the best frequency for this second vibration must be determined empirically, as must the best amplitude.

Advantageously, the process according to the invention is carried out by an apparatus wherein a trough extending over the whole width of the core plates to be coated and adapted to receive the coating material is disposed above a conveyor which moves the core plates for coating at a continuous speed and which, conveniently, takes the form of a possibly multi-element conveyor belt with appropriate provision for support of its leader, the trough base being semicircular and provided with openings over some of its area, these openings or apertures being adjacent to each other. An agitator is disposed in the interior of the trough and has a horizontal shaft mounted in the trough, and radial arms, which extend very close to the bent and apertured baseplate, are mounted on the shaft and have cross-bars or the like; in this manner the cooating material present in the trough is kept moving and is loosened, and some of such material is forced through the screen-like base to drop therefrom onto the outside of the core plate to be coated. It is advantageous if the agitator shaft reciprocates oscillatingly, to ensure that the elements which force the compound through the trough base do not always operate in the same radial plane. Equally well, however, the radial arms which bear the agitating elements can be disposed with a slight axial stagger relatively to one another.

If the apparatus is to operate satisfactory, the trough must be filled only to a level below the level of the arc described by the agitating elements on the arms, i.e., the agitating elements must emerge from the compound in the trough and travel some distance through the air above the compound. If the trough is overloaded, it has been found that the coating compound in the trough is rotated and the apparatus ceases to operate correctly. A supply tank therefore must be provided above the trough, and a given amount of coating compound is taken from the supply tank periodically and introduced into the trough. The dispensed quantity is such as to be equivalent to the quantity removed from the trough to form the covering layer; the level of the compound in the trough then always remains at the correct height.

Advantageously, the trough can be suspended on weight beams which are kept in an equilibrium position by a counterweight. As coating compound is consumed, the weight of the trough decreases and so the trough is raised by the counterweight on the weight beam, and this movement acts via a control mechanism to start the feeder which supplies a further measured amount of compound to the trough. The compound level in the trough therefore can be maintained at the required height readily and in a simple manner.

Behind the trough are one or more of the oscillating axially reciprocating rollers responsible for distributing, evening out, compressing and possibly smoothing the coating material applied to the core plate. These rollers, which are made of metal, can, if required, have a covering of rubber or plastics or some similar substance which can, if required, be profiled or patterned. Of course, patterning or similar rollers can follow these rollers, if required, to impress a pattern into the covering layer or to treat the same in some other manner.

Laminated panels are known which comprise a core plate made of any substance, such as hard foamed plastics, e.g., polystyrene foam, phenolic resin foam, PVC foam and so on, and of at least one water-based covering layer, more particularly a wood-fiber layer or a layer of inorganic fibers or the like. A laminated panel also is known wherein a non-flammable filling in grain or fiber form, bound by foamed plastics, is provided between two outer panels of e.g., gypsum. The known laminated panels are good insulators, because of the presence of the foamed material, but their strength is limited; also, they cannot be used generally as finished building components because their surface always need some sort of a finishing operation. In concrete- or cement-coated panels, the cement-bound coating must be relatively thick if they are to provide the required strength. Unfortunately, if the coatings are thick, the plates must be relatively small, for in the larger kind of panel the covering layer may tear away or the plate may break easily; also the panel becomes very heavy.

It is known, in cases where plastics are used as binders of fiber layer, to use glass fiber fabrics which impart very high strength.

It is another object of the invention to provide a building panel which, besides being a very good insulator with respect to heat, cold, sound and moisture, is very light, yet very strong and resilient, is a substantially finished product having a hard but "breathing" surface, and is simple and economical to manufacture. The panel is also required to be of general use for inside walls as well as outside walls.

According to the invention, in laminated building panels having a core plate made of hard foamed plastics, the water-based and possibly plasticized coating layers are made of particles of hard foamed plastics, wood chips or sawdust, grains or the like, more particularly of foamed polystyrene and mineral fibers, in which a reinforcing fabric, more particularly a glass fiber fabric, is embedded.

The covering layer of the building panels according to the invention can be laminated; for instance, one or more layers are provided, of which the top covering layer is an insulating material giving active protection. This procedure is very advantageous in cases where the panels according to the invention are used as prefabricated multistory building components, for no further finishing is necessary and the time for erection of the building thus is reduced considerably. It is recommended for these laminated panels according to the invention that the reinforcing fabric be placed in the layer which is closest to the foamed plastics panel and which, opportunely, has a greater strength.

The coating can be made of any known, and preferably, water-based material, such as cement mortar, magnesite with magnesium chloride liquor, Roman cement or Roman lime. Covering or decorating layers of this kind can absorb condensation of water and subsequently give it off into the air. Since the water storage capacity provided by a thin coating is often inadequate, for instance, when cold rooms are heated or in kitchens, the invention therefore proposes that, in addition to the mineral substances in the covering layer, there be added to the compound which subsequently will form the coating, hard foamed plastics particles in the form of sawdust, chips, granular material or the like which improve the insulation of the covering layer and ensure that the same is satisfactorily resilient.

Advantageously, the water-based binders are plasticized in some appropriate and known fashion, more particularly by addition of a plastics dispersion, such as polyvinyl propionate, polyvinyl acetate or the like, before the compound is applied to the core plate. A layer which has been thus plasticized is much more able to withstand local stress, for instance impacts, of the kind occurring more particularly in transportation; also, the overall strength of the laminated panel is improved because the covering layer, being resilient and therefore stretchable when pulled, has its stretch taken up completely by the reinforcing fabric without the coating becoming crazed, while compressive loads are dealt with by the highly compressible water-based covering layer. The bending strength of the panels therefore is improved considerably, and the load which the panels according to the invention can withstand thus is considerably better than for any known laminated panel.

If the reinforcing fabric is in mat form, it is very advantageous that the fabric warp and weft (or fill) be equally thick. The panel or, more accurately, the covering layer then has a mattress-like reinforcement so that the panel has substantially the same strength in all directions. In heavier panels, or in panels having a number of coatings, two reinforcing fabrics can be embedded one above another in one layer or between two coating layers; in this event one fabric can be disposed diagonally to the other to further improve the lead uniformity in all directions.

A preferred embodiment of an apparatus which is used advantageously to perform the process according to the invention is illustrated diagrammatically in FIG. 1 of the drawings and will be described in greater detail hereinafter.

FIGS. 2–5 of the drawings each are a cross-section through various embodiments of insulating panels according to the invention.

FIG. 1 is a longitudinal section through an apparatus according to the invention for applying two covering layers, with a glass fiber fabric web embedded between them, to core plates made of foamed hard plastics.

An endless conveyor belt 11 running around two guide rollers 12 moves core plates 13 continuously below coating or applicator devices 14, 14' both of which normally are of identical construction. Above the roller 12 at the feed end of the belt 11 is a pressing roller 15 which acts on the top of the plates 13 to ensure a continuous advance thereof. The leader 11a of belt 11 is borne by means of bearing rollers 16 and bearing plates 17 to ensure that the core plates 13 move in a single horizontal plane over the whole length of the belt 11. The two applicator devices 14, 14' each comprise a rectangular trough 18 having a semicircular base 19 apertured screen or sieve-fashion over a portion 20. Below the trough base 19 are one or two slides or the like 21 which are movingly mounted and which can be pivoted before the screen-like portion 20 of the trough base 19 to allow exact dispensing of the compound or to prevent any further exit of compound from the trough 18, for instance, when the conveyor 11 is at a stop. Disposed in the trough 18 is an agitator 22 having a horizontal shaft 23 on which there are mounted radial arms 24 having at their ends agitating elements in the form of cross-bars or the like 25; the same move along the semicircular trough base 19 and screen-like part 20 at some distance from the base and such part.

At its two end faces the trough 18 is secured to one weight beam 26 each; the weight beams 26 are borne by a stationary bearing 27. At the other, free, end of weight beams 26 there is an adjustable load weight 28 which counterbalances the compound-filled trough 18. Disposed, for instance, above the weight bam arm which bears the counterweight 28 is a contact transmitter 29 which is stationary and adjustable and which is operated by a reduction in trough weight (due to compound leaving the trough 18) to start driving mechanism 30 of a compound feeder 31.

The latter takes the form of a box-like slide 32 which is disposed below a funnel-shaped supply tank 33 and which receives a predetermined quantity of coating compound. The slide 32 is moved by the driving device 30 by means of a push rod 34 towards the trough 18, and it empties its contents into the trough during this movement. Simultaneously, the bottom exit aperture 35 of the tank 33 is closed by a cover slide 36 disposed on the box-like slide 32. After the empty box 32 has returned, it is refilled with compound dropping out of the tank 33. As FIG. 1 shows, the box can reciprocate either linearly or along an arc.

Disposed after the first applicator 14, as considered in the direction of movement of the core plates 13, is a roller 37 which distributes, evens out and compresses, to form a first layer 39, the loose compound 38 issuing from the base 20 onto the plate 13. Preferably, the roller 37 has a rough surface and reciprocates, or oscillates, axially by a driving mechanism known per se. Below the roller 37 is a support plate 17 over which the leader 11a of the conveyor belt 11 moves. The roller 37 is driven at a speed synchronized with the speed of the plate movement. Behind the roller 37, a web 41 of glass fiber fabric is drawn off a supply roll 40 and pressed onto the first coating layer 39 by means of a roller 42. The second applicator 14' then applies a loose compound layer 43 to the first covering layer 39 and to the web 41, whereafter roller 44 shapes the layer 43 into the top coating layer. The next roller 46 is, for instance, for after-treatment or, if required, for embossing the covering layers.

Figure 2:
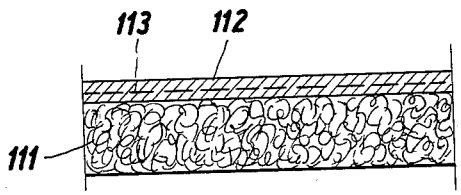

The laminated panel illustrated in FIG. 2 is in the form of a foamed hard-plastics panel 111, for instance, of foamed polystyrene, with a covering layer 112 on one side with a glass fiber fabric 113 embedded in it; the layer 112 or the additives thereto are bound, for instance, by cement or some similar appropriate, known, and preferably water-based, binder which also provides a firm bond between the layer 112 and the plate 111.

Figure 3:
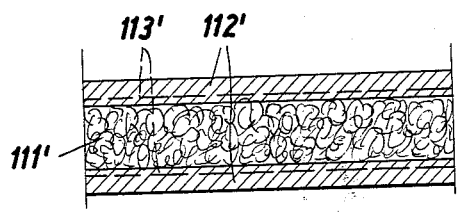

The laminated building panel illustrated in FIG. 3 also has as its core a foamed hard plastics plate 111', and has covering layers 112' on both sides, a glass fiber fabric 113' being embedded inside each layer 112'.

Figure 4:
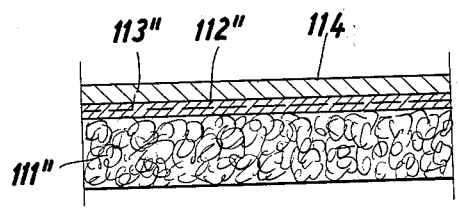

FIG. 4 illustrates a building panel made of a foamed hard plastics plate 111" to which a relatively hard layer 112" is first applied, a glass fiber fabric 113" being embedded in the layer 112". A second coating layer 114 made of a relatively soft insulating or "absorptive" layer and adapted to absorb moisture, is placed on the layer 112". The layer 114, which could be called an "active layer," is produced from a composition having a relatively high proportion of particles of foamed hard plastics. A panel of this kind is very useful for prefabricated buildings. Of course, in this event the panel is made story-high, something which, because of the low weight of the building panels according to the invention, taken together with the great strength of the resilient and reinforced coating layers, is readily feasible without any fear of damage during transportation.

Figure 5:
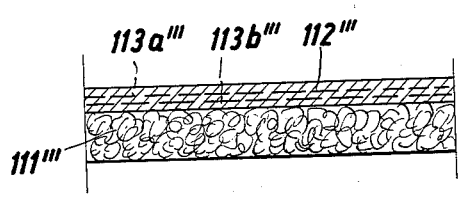

Another embodiment of a building panel according to the invention is illustrated in FIG. 5, also in the form of a foamed hard plastics panel 111'''' and of a water based covering layer 112'''; two glass fiber fabrics 113a''' and 113b''' are embedded one above another in the layer 112'''. Conveniently, the two fabrics 113a''' and 113b''' are disposed diagonally to one another. Of course, the embodiments illustrated in FIGS. 4 and 5 can be further varied by the water-based coating layers 112'', 112''' respectively, being disposed—as in the embodiment illustrated in FIG. 3—on both sides of the core plate 111'', 111''', respectively.

It has previously been considered essential, more particularly with coating layers made of water-based substances, to dispose basically similar covering layers on the two sides of a foamed hard plastics panel, with a view more particularly to reducing distortion of the laminated panel. This ceases to be necessary with the panels according to the invention if appropriate binders and additives are used for the covering layer in association with the reinforcing fabric; indeed, the panel, as is shown for the embodiment illustrated in FIGS. 2, 4 and 5, can readily be coated on one side and, if required, the other, uncoated side of the panel can have a covering layer of some other nature.

As stated in the introduction hereof, cements (or concretes) with or without an admixture of lime, Roman cements and Roman lime, and magnesite containing magnesium chloride liquor, have proved satisfactory binders for the covering layer. As additives, there can be considered, in addition to sawdust, saw chips, granular material, beads or pearls or the like of hard foamed plastics, more particularly stone dust, quartz sand or the like; the proportions of the mixtures are determined empirically so that the coefficient of expansion of a covering layer thus bound is at least near the coefficient of expansion of the core panel. Of course, care must be taken in the conventional manner to ensure that the binder does not shrink in the compound during setting; this requirement is met very satisfactorily by Roman cements as well as the standard cements. Story-high building panels—i.e., building panels of very large size—therefore can be produced readily. The possibilities for surface patterning of the panels are very wide and can be adapted very satisfactorily to suit particular purposes.

In the embodiments hereinbefore described, the main reinforcing fabric referred to has been glass fiber fabric; since it withstands substantially all chemical attacks, it has proved very satisfactory for this purpose.

For the layer bearing a static load, a mixture of the following composition has proved very satisfactory:

Portland cement _____ kg__ 1
25% plastics dispersion _____ kg__ 1
Quartz sand _____ kg__ 1
Foamed hard plastics sawdust _____ liter__ 1

The following proportions are very advantageous for the outer covering layers:

(1)
Portland cement _____ kg__ 1
25% plastics dispersion _____ kg__ 1
Foamed hard plastics sawdust _____ liters__ 5

(2)
Roman cement _____ kg__ 1
25% plastics dispersion _____ kg__ 1
Foamed hard plastics saw chips _____ liters__ 4

I claim as my invention:
1. A process for the production of hard but resilient load-bearing insulating plates, which comprises coating a foamed plastic core plate, in horizontal motion at a steady speed, by directly dropping thereon, at one point of its travel, fine particles of a water-based plasticized coating selected from the group consisting of concrete, Roman lime, Roman cement, magnesite mixed with magnesium chloride liquor, and foamed polystyrene in the absence of any extraneous adhesive interlayer; to which coating a filler had been added selected from the group consisting of wood chips, sawdust, quartz sand, stone dust, and comminuted hard foamed plastics; smoothing the dropped coating into a continuous covering layer; compressing same; shaping into a desired surface pattern; and repeating the coating operation until a predetermined thickness has been attained; said smoothing and compressing steps being carried out while applying a sawtooth oscillation to said core plate of approximately 20 to 50 mm. amplitude and a frequency of approximately 280 to 360 oscillations per minute.

2. A process for the production of hard but resilient load-bearing insulating plates, which comprises coating a foamed plastic core plate, in horizontal motion at a steady speed, at one point of its travel, directly with fine particles of water-based coating selected from the group consisting of concrete, Roman lime, Roman cement, magnesite mixed with magnesium chloride liquor, and foamed polystyrene in the absence of any extraneous adhesive interlayer; smoothing the dropped coating into a continuous covering layer; compressing same; shaping into a desired surface pattern; and repeating the coating operation until a predetermined thickness has been attained; said smoothing and compressing being carried out while applying a sawtooth oscillation to said core plate of approximately 20 to 50 mm. amplitude and a frequency of approximately 280 to 360 oscillations per minute.

3. A process for the production of hard but resilient load-bearing insulating plates, which comprises coating a foamed plastic core plate, in horizontal motion at a steady speed, by directly dropping thereon, at one point of its travel, small particles of a plasticized water-based coating selected from the group consisting of concrete, Roman lime, Roman cement, magnesite mixed with magnesium chloride liquor, and foamed polystyrene in the absence of any extraneous adhesive interlayer; smoothing the dropped coating into a continuous covering layer; compressing the same; covering said compressed layer with glass fiber fabric; dropping a second coat onto said fabric; smoothing into a continuous second covering layer; compressing and shaping into a desired surface pattern; both smoothing and compressing operations being carried out while applying a sawtooth oscillation of approximately 20 to 50 mm. amplitude and a frequency of approximately 280 to 360 oscillations per minute.

4. A process for the production of hard but resilient load-bearing insulating plates, which comprises coating a foamed plastic core plate, in horizontal motion at a steady speed, by directly dropping thereon, at one point of its travel, small particles of a plasticized water-based coating selected from the group consisting of concrete, Roman lime, Roman cement, magnesite mixed with magnesium chloride, and foamed polystyrene in the absence of any extraneous adhesive interlayer; said coating having a filler added selected from the group consisting of wood chips, sawdust, quartz sand, stone dust, and comminuted foamed hard plastics; smoothing the dropped coating into a continuous covering layer; compressing the same; covering the same with a glass fiber fabric; dropping thereon a second coat; smoothing said second coat into a continuous second covering layer; compressing the same; and shaping into a desired surface pattern; both smoothing and compressing steps being carried out while applying an axial sawtooth oscillation of approximately 20 to 50 mm. amplitude and a frequency of approximately 280 to 360 oscillations per minute.

5. The process as defined in claim 1, wherein said coating is plasticized with a substance selected from the group consisting of polyvinyl acetate and polyvinyl propionate.

6. The process as defined in claim 4, wherein said coating is plasticized with a substance selected from the group consisting of polyvinyl acetate and polyvinyl propionate.

7. The process as defined in claim 2, wherein a glass fiber fabric is inserted between two consecutive covering layers.

References Cited by the Examiner

UNITED STATES PATENTS

| | | | |
|---|---|---|---|
| 1,819,200 | 8/1931 | Robinson | 156—390 |
| 1,873,040 | 8/1932 | Robinson | 156—390 |
| 2,275,989 | 3/1942 | Perry | 156—279 |
| 2,291,140 | 7/1942 | Bowyer | 161—161 |
| 2,404,207 | 7/1946 | Ball | 156—279 X |
| 2,660,217 | 11/1953 | Lawson | 156—279 |
| 2,886,730 | 12/1958 | Potchen et al. | 161—93 |
| 2,888,360 | 5/1959 | Sherts et al. | |
| 3,043,730 | 7/1962 | Adie | 161—68 |

EARL M. BERGERT, *Primary Examiner.*

MORRIS SUSSMAN, *Examiner.*